United States Patent Office.

LEO GANS, OF FRANKFORT, GERMANY, ASSIGNOR TO LEOPOLD CASSELLA & CO., OF SAME PLACE.

AMIDO-NAPHTHOL-MONOSULPHONIC ACID.

SPECIFICATION forming part of Letters Patent No. 454,645, dated June 23, 1891.

Application filed December 20, 1889. Serial No. 334,449. (Specimens.)

*To all whom it may concern:*

Be it known that I, LEO GANS, doctor of philosophy, a citizen of the Empire of Germany, and a resident of Frankfort-on-the-Main, Germany, have invented certain new and useful Improvements in the Production of a New Acid and of Dye-Stuffs Deriving Therefrom, of which the following is a specification.

This invention relates to a new process for preparing an amido-beta-naphthol-monosulphonic acid hitherto unknown and the production of new coloring-matters by means of this new acid, some of which products form the subject of a separate patent, No. 442,369, issued to me December 9, 1890.

A preparation of amido-beta-naphthol-monosulphonic acid from the acid which is described in the German Patent No. 35,019, and which can be obtained by treating with ammonia the beta-naphthol-gamma-disulphonic acid of the United States Patent No. 331,059. Thirty-six kilos of this acid with thirty kilos caustic soda and fifteen kilos water are heated in an autoclave during six hours to the temperature of 210° centigrade. The melt is diluted with water and acidulated. Sulphurous acid escapes, and the amido-naphthol monosulphonic acid is precipitated in the form of small colorless crystals. The salts of this acid are easily soluble in water. The sodium salt crystallizes in needles. The acid itself is difficultly soluble in water. When nitrate of soda is added to the acid solution, a yellow body separates, which is scarcely soluble, and which by the action of an alkali, especially under the influence of heat, is transformed into a violet coloring-matter. It has the properties of a diazo compound and combines with amines and phenols, forming azoic colors. The amido-naphthol-monosulphonic acid reacts very easily on diazo bodies.

Two different classes of dye-stuffs are obtained when the operation takes place in acid or in an alkaline solution. The products resulting from the operation in acid solution have the general character of colors derived from naphthylamines substituted by hydroxyl, while the products resulting from the operation in alkaline solution have the character of azotized colors derived from naphthols substituted by $NH_2$. The colors of both these classes have a remarkably great resistance against the action of alkalies (milling, scouring) and dye wool very evenly. The dye-stuffs deriving from tetrazo bodies dye unmordanted cotton deep shades, varying from violet and blue to black.

In order to describe how I operate, I give the following examples:

*Example* I. — Fourteen kilograms paraniline are diazotized, and the diazo compound is caused to run into the solution of twenty-seven kilograms amido-naphthol-monosulphonate of sodium containing an excess of acetate of sodium. The resulting dye-stuff is easily soluble. It dyes wool a reddish violet. If the operation is made in alkaline solution— for instance, in presence of soda—a blue solution is obtained, from which acids precipitate a dye-stuff which dyes wool a brownish red.

*Example* II.—Thirty kilograms beta-naphthylamine disulphonic acid are diazotized and combined with twenty-seven kilograms amido-naphthol-monosulphonate of sodium in solution containing acetic acid. A bluish red results, which dyes wool very evenly.

*Example* III.—Thirty-five kilograms amido-azo-benzole disulpho-acid are diazotized and combined in slightly-acidulated solution with twenty-seven kilograms amido-naphthol-monosulphonate of sodium. The resulting dye-stuff is easily soluble. It dyes wool a bluish violet. The analogous dye-stuff resulting from the formation in alkaline solution dyes wool a brown shade.

*Example* IV.—Fifty kilograms of the dye-stuff resulting from naphthylamine disulphonic acid and alpha-naphthylamine are diazotized, and the diazo-azo compound is introduced into the weakly-acidulated solution of twenty-seven kilograms amido-naphthol-monosulphonate of sodium. A greenish-black dye-stuff results, which on wool produces a black, fast to washing.

*Example* V. — Eighteen and four-tenths kilograms benzidine are diazotized and in alkaline solution combined with fifty-four kilograms amido-naphthol-monosulphonate of sodium. A difficultly-soluble precipitate of a dye-stuff is formed immediately, which dyes unmordanted cotton in alkaline or in neutral bath containing some common salt a bluish black of great intensity. The same combination in acid solution produces a violet dye-stuff.

*Example* VI.—The amido-naphthol-monosulphonic acid may as well be used for the production of mixed coloring-matters. For this purpose I may first combine tetrazodiphenyl or similar tetrazo compounds with one equivalent of the amido-naphthol-monosulphonic acid, and then react with this intermediate product on phenols, amines, or their sulpho-acids, or employ the inverse method, combining the intermediate products of tetrazo diphenyl, &c., and amines or phenols with amido-naphthol-monosulphonic acid. For instance, twenty-one kilograms tolidine are diazotized and first combined in well-cooled alkaline solution with twenty-seven kilograms of amido-naphthol-monosulphonic acid. The intermediate product, which is nearly insoluble in water, is introduced into an alkaline solution of thirty-five kilograms beta-naphthol-delta-disulphonic acid. The dye-stuff dyes cotton a deep blue.

The diazo compounds enumerated in the above examples can be replaced by equivalent quantities of the diazo derivatives of aniline, the toluidines, the naphthylamines, amido-azotoluol, methyl-benzidine, tolidine, diamido-stilbene, or their sulpho-acids, paraphenylenediamine, diamido-diphenol ethers, diamido-æthoxydiphenyl, the amido-azo compounds of the general formula $$R(SO_3H)x-N-N-C_{10}H_6NH_2(a)$$

for a description of which see American Patent No. 345,901.

What I claim as my invention is—

1. The process hereinbefore described of producing azoic coloring-matters, the same consisting in preparing an amido-naphthol-monosulphonic acid by transforming by the action of a caustic alkali the beta-naphthylamine-gamma-disulphonic acid and combining the diazo derivatives of aromatic monomines or diamines with the amido-naphthol-monosulphonic acid.

2. The process herein set forth of preparing the gamma-amido-naphthol-monosulphonic acid, which consists in subjecting the beta-naphthylamine-gamma-disulphonic acid to the action of a caustic alkali at a temperature of 210° centigrade, or thereabout.

3. As a new article of manufacture, the gamma-amido-naphthol-monosulphonic acid hereinbefore described, which forms small colorless crystals nearly insoluble in water and changed by the addition of sodium nitrate into a yellow nearly insoluble substance adapted to form dyes.

In testimony that I claim the foregoing as my invention I have signed my name, in presence of two witnesses, this 14th day of November, 1889.

LEO GANS.

Witnesses:
THEODOR ENGEL,
ERNST H. SCHENCK.